United States Patent [19]
Lin

[11] Patent Number: 6,099,004
[45] Date of Patent: Aug. 8, 2000

[54] TORQUE BALANCE ROD ASSEMBLY FOR VEHICLES

[76] Inventor: Min-Chyr Lin, 90, Pei-Hei, Shui Shang Hsiang, Chia Yi Hsien, Taiwan

[21] Appl. No.: 09/102,350

[22] Filed: Jun. 23, 1998

[51] Int. Cl.$^7$ .................................................. B60G 11/18
[52] U.S. Cl. .................................. 280/124.107; 403/296; 280/124.152
[58] Field of Search ...................... 280/124.106, 124.166, 280/124.167, 124.152, 124.154; 403/361, 286, 293, 296; 14/181

[56] References Cited

U.S. PATENT DOCUMENTS

| | | | |
|---|---|---|---|
| 4,842,298 | 6/1989 | Jarvis | 280/689 |
| 5,520,376 | 5/1996 | Langa et al. | 267/273 |
| 5,520,407 | 5/1996 | Alatalo et al. | 280/723 |
| 5,791,679 | 8/1998 | McLaughlin | 280/673 |

*Primary Examiner*—Brian L. Johnson
*Assistant Examiner*—Tony Winner
*Attorney, Agent, or Firm*—Larson & Taylor

[57] ABSTRACT

A torque balance rod assembly for vehicles includes a torque rod having at least two longitudinal threaded holes extending therethrough. At least two connecting members are securely attached to each of two ends of the torque rod. Each connecting member includes a first threaded end in threading engagement with one of two ends of an associated longitudinal hole and a second end. A nut is mounted on the first threaded end of each connecting member to retain the connecting member in position. Two bases are secured to a vehicle, and each base includes two spaced posts formed thereon for holding the second ends of the connecting members therebetween. A retaining member is provided for retaining the connecting members and the posts together.

5 Claims, 5 Drawing Sheets

TORQUE BALANCE ROD ASSEMBLY FOR VEHICLES

BACKGROUND OF THE INVENTION

1. Field of the Invention

The present invention relates to a torque balance rod assembly for vehicles.

2. Description of the Related Art

Taiwan Patent Application No. 82205562, as shown in FIG. 6 of the drawings, discloses a torque balance rod assembly for vehicles in which the torque balance rod assembly includes two angled rods 31 and 32 each having two ends with inner threading and an adjusting screw 4 threadedly engaged between the angled rods 31 and 32. The adjusting screw 4 includes a separating member 41 that separates the adjusting screw 4 into two threaded sections with different leads (e.g., one of the threaded sections may have a left lead while the other threaded section may have a right lead), and the inner threading of the associated inner ends of the angled rods 31 and 32 have corresponding leads. In addition, the outer end of each angled rod 31, 32 includes a connecting member 53, 54 mounted thereto. Each connecting member 53, 54 includes a first threaded end in threading engagement with the threaded outer end of the associated angled rod 31, 32 and a second end having a hole defined therein so as to be securely attached to a base 2. However, it is found that the connecting members 53, 54 might be twisted vertically and/or horizontally when the vehicle runs on a rugged road or takes a sudden turn. As a result, the torque conversion effect is found unsatisfactory, as the vehicle per se is unstable.

The present invention is intended to provide an improved torque balance rod assembly to solve this problem.

SUMMARY OF THE INVENTION

It is a primary object of the present invention to provide an improved torque balance rod assembly in which vertical and horizontal twisting motions of the connecting members thereof are prevented from to provide a better torque conversion effect as well as a better balance for the vehicle.

A torque balance rod assembly for vehicles in accordance with the present invention comprises a torque rod including at least two longitudinal threaded holes extending therethrough. At least two connecting members are securely attached to each of two ends of the torque rod. Each connecting member includes a first threaded end in threading engagement with one of two ends of an associated longitudinal hole and a second end. A nut is mounted on the first threaded end of each connecting member to retain the connecting member in position. Two bases are secured to a vehicle, and each base includes two spaced posts formed thereon for holding the second ends of the connecting members therebetween. And means is provided for retaining the connecting members and the posts together. A washer with at least two holes may be mounted between the nuts and the torque rod. The connecting members may include a pad block mounted therebetween.

In an embodiment of the invention, the retaining means includes a retaining member for holding the posts and the connecting members, a fastener element extending through the posts and the connecting members, and a second nut mounted to the retaining member. Preferably, the retaining member includes a reinforcing rib formed thereon.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
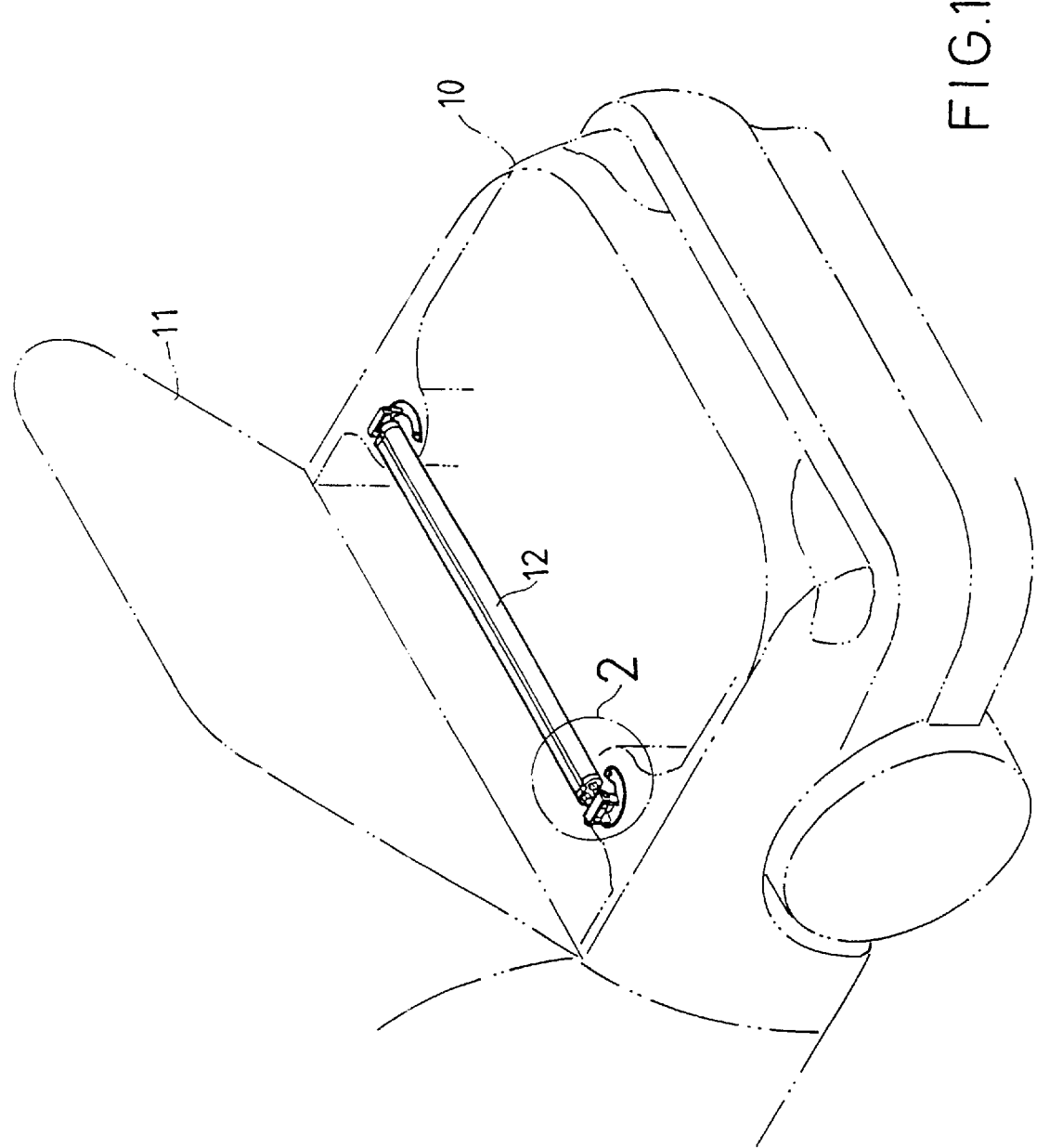
FIG. 1 is a schematic perspective view of a front portion of a vehicle equipped with a torque balance rod assembly in accordance with the present invention.
Figure 2:
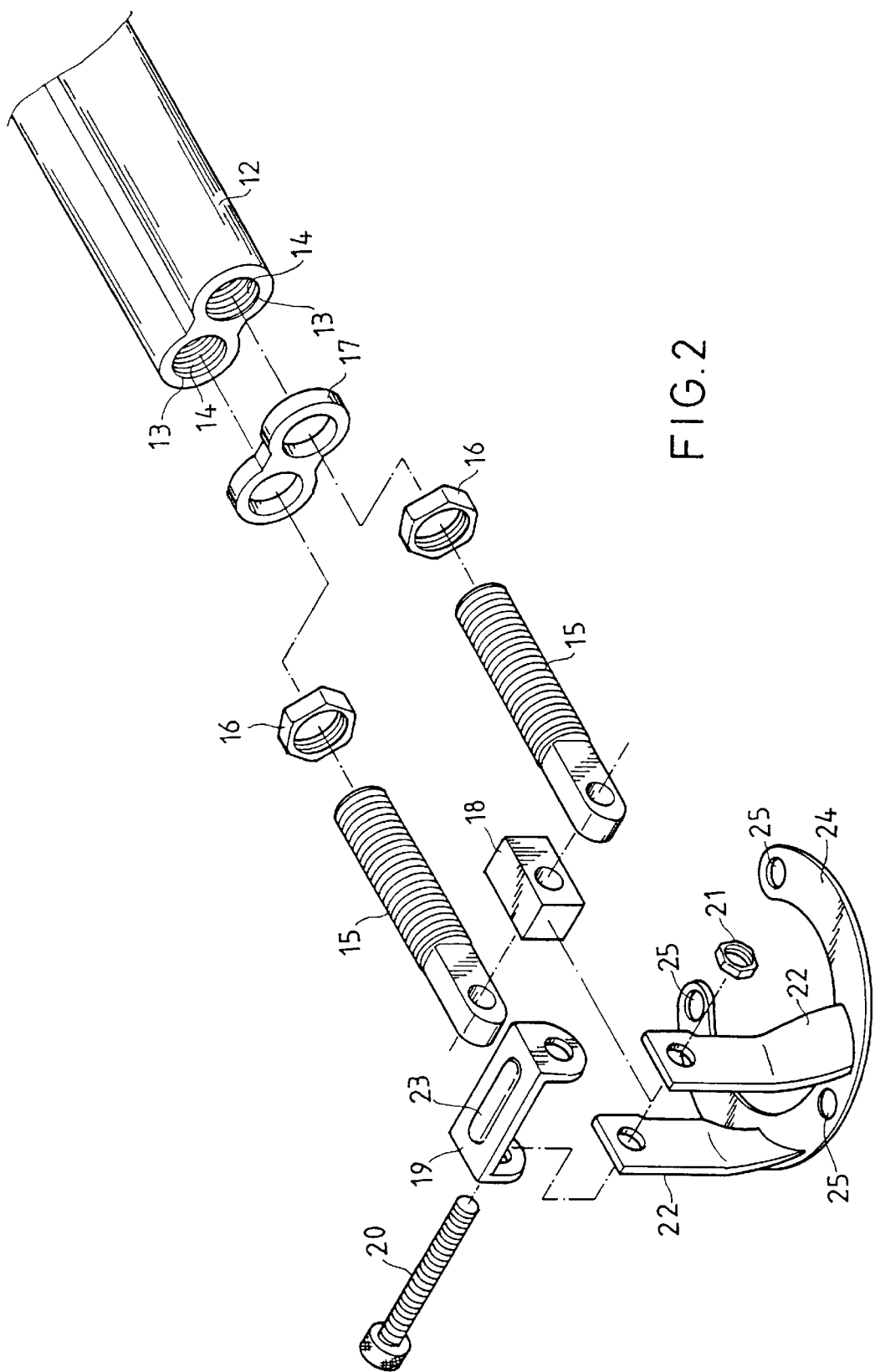
FIG. 2 is an enlarged exploded perspective view of a circle in FIG. 1, illustrating a portion of the torque balance rod assembly in accordance with the present invention.

Referring to the drawings and initially to FIGS. 1 and 2, a torque balance rod assembly in accordance with the present invention is mounted under an engine hood 11 of a vehicle 10 and generally includes a torque rod 12 having two spaced longitudinal threaded holes 13 extending therethrough. FIG. 2 illustrates an end of the torque balance rod assembly, the other end being a mirror image. Two connecting members 15 are connected to each end of the torque rod 12. Each connecting member 15 has a first threaded end in threading engagement with an end 14 (with inner threading) of an associated longitudinal hole 13. A nut 16 may be mounted around the first threaded end of each connecting member 15 before engagement between the connecting member 15 and the longitudinal hole 13. Preferably, a washer 17 with two holes is provided between the nuts 16 and the washer 17. The nuts 16 assure secure engagement between the connecting members 15 and the torque rod 12. A pad block 18 is mounted between second ends of two connecting members 15 mounted on the same side of the torque rod 12, and means is provided to secure the connecting members 15 and the pad block 18 to a base 22, which, in turn, is secured to the vehicle by means of extending bolts or screws through holes 25, which is conventional and therefore not further described.

Figure 4:
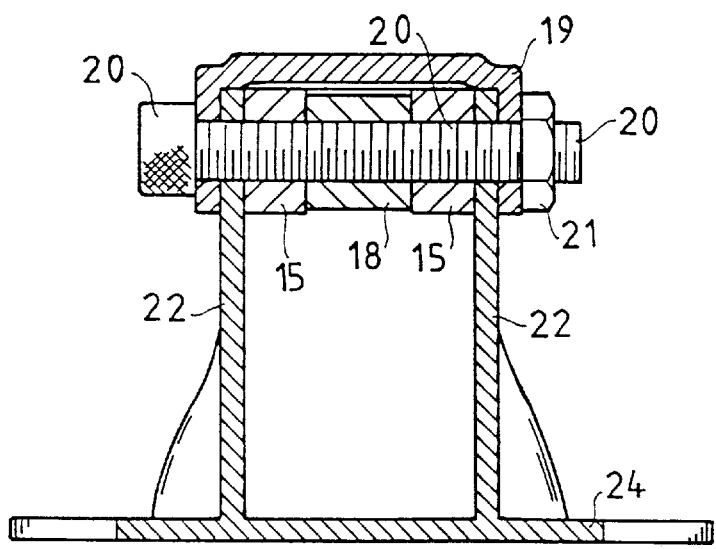
FIG. 4 is a sectional view taken along line 4—4 in FIG. 3.

In this embodiment, the base 24 includes a pair of posts 22 formed thereon and defining a space therebetween to hold the second ends of the two connecting members 15 and the pad block 18 therebetween, as shown in FIG. 4. A substantially U-shaped retaining member 19 is provided to hold the posts 22, and a fastener element (e.g., a bolt 20) is extended through holes (not labeled) defined in the U-shaped retaining member 19 and holes (not labeled) defined in the posts 22 while a nut 21 is provided for positioning purpose. A reinforcing rib 23 may be formed on the retaining member 19. Accordingly, the torque rod 12 is prevented from being twisted vertically and/or horizontally to provide reliable torque conversion. Even if the vehicle is running on a rugged road or taking a sudden turn, a better balance can be achieved.

Figure 3:
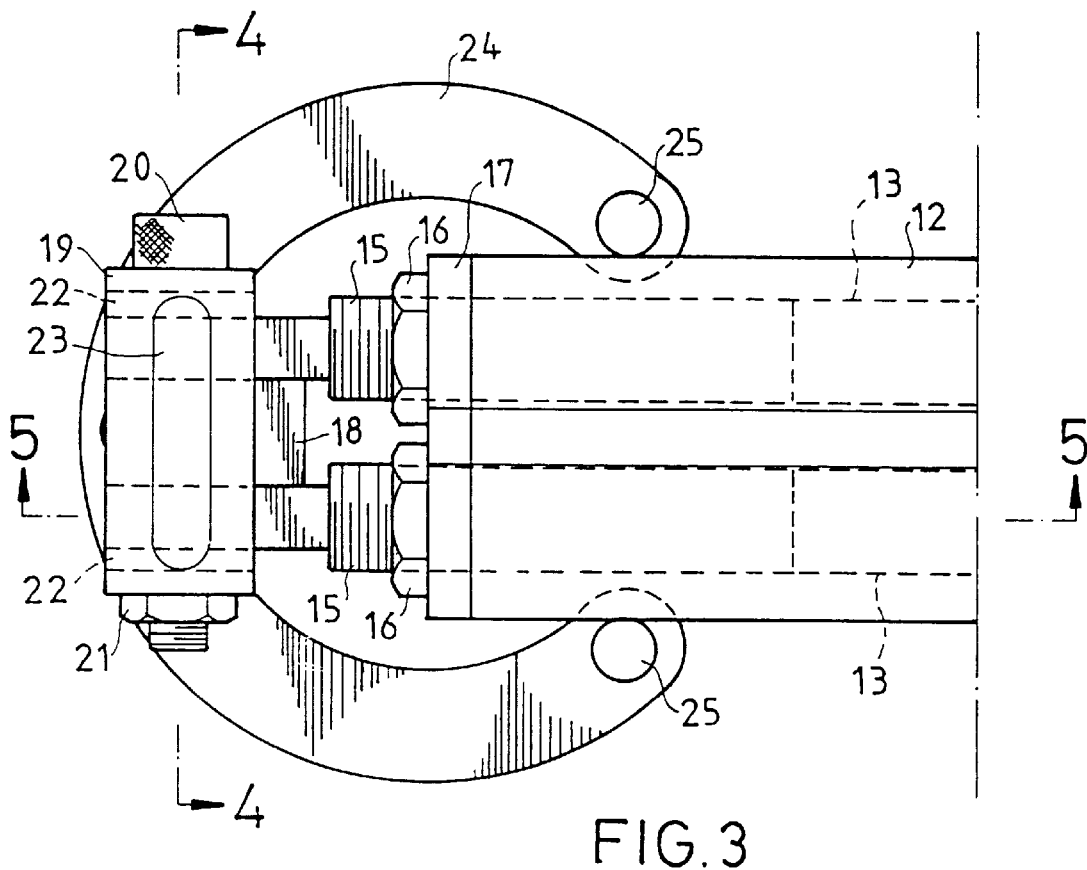
FIG. 3 is a top view of a portion of the torque balance rod assembly in accordance with the present invention.
Figure 5:
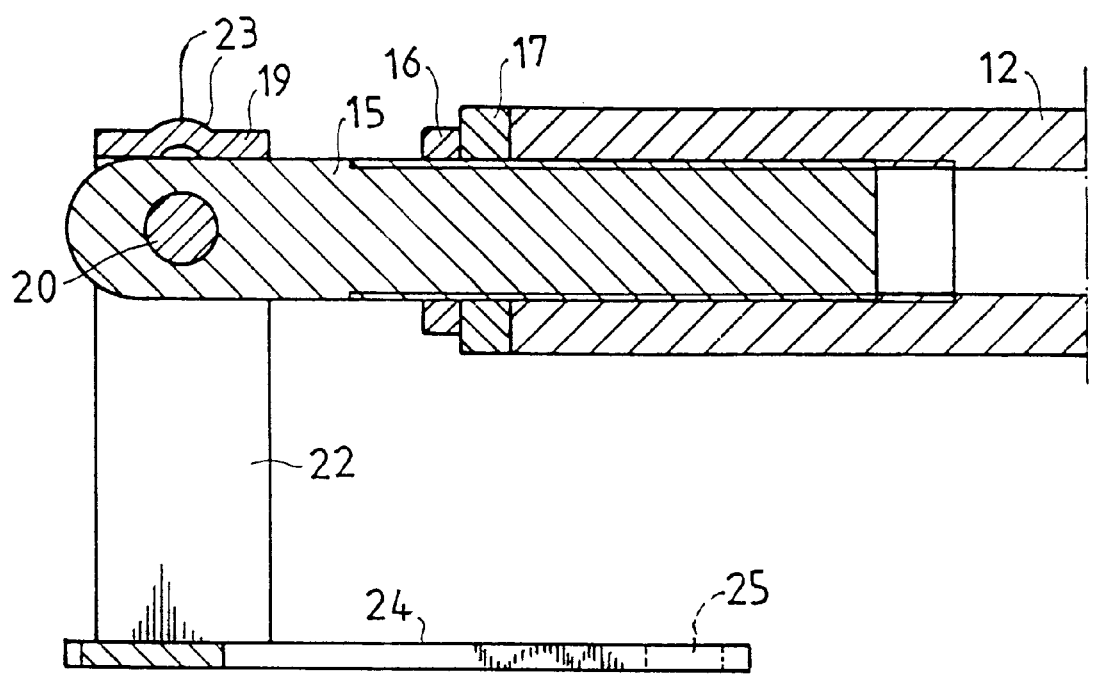
FIG. 5 is a sectional view taken along line 5—5 in FIG. 3.
Figure 6:
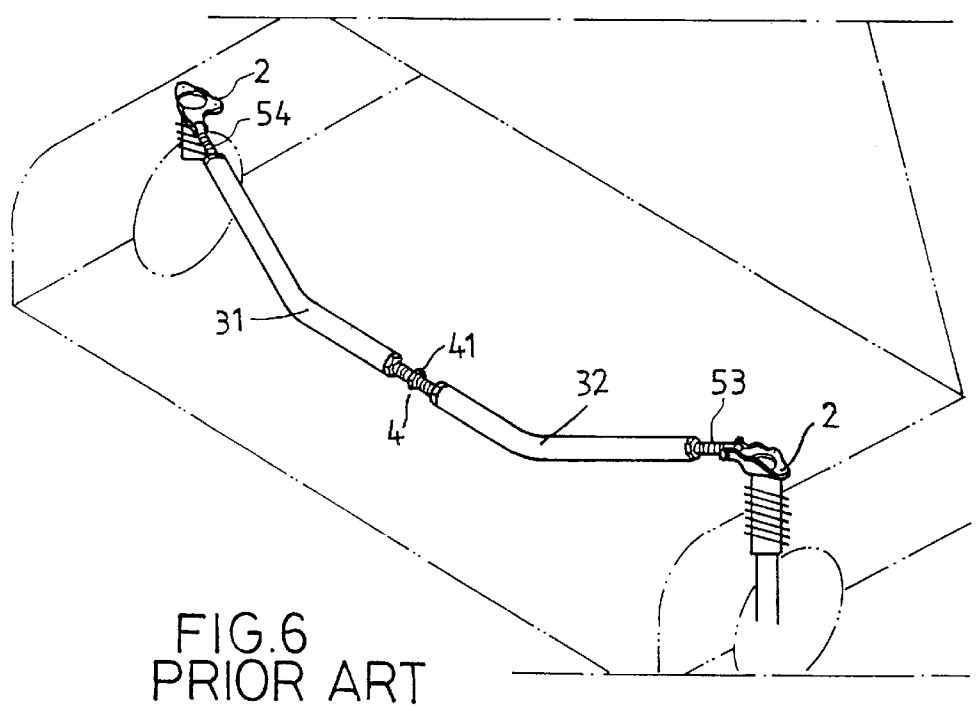
FIG. 6 is a schematic perspective view of a torque balance rod assembly according to prior art.

FIG. 3 illustrates a top view of the torque balance rod assembly, while FIGS. 4 and 5 are sectional views respectively taken along line 4—4 and line 5—5 in FIG. 3. It is found that the torque balance rod assembly of the present invention is less likely to wear than the conventional design, as the former is subjected to a lower load. As shown in FIG. 5, the connecting members 15 are securely retained in position by the nuts 16 to improve the torque of the torque rod. Accordingly, a reliable, stable, balanced condition of the vehicle is achieved.

Although the invention has been explained in relation to its preferred embodiment, it is to be understood that many other possible modifications and variations can be made without departing from the spirit and scope of the invention as hereinafter claimed.

What is claimed is:

1. A torque balance rod assembly for vehicles, comprising:

a torque rod having two ends and including at least two longitudinal threaded holes extending therethrough, each said longitudinal hole with two ends, at least two connecting members securely attached to each said end of said torque rod, each of said at least two connecting members including a first threaded end in threading engagement with one of the ends of an associated said longitudinal hole and a second end, a nut mounted on the first threaded end of each of said at least two connecting members to retain each of said least two connecting members in position, two bases adapted to be secured to a vehicle, each said base including two spaced posts formed thereon for holding said second ends of said at least two connecting members therebetween, and means for retaining said at least two connecting members and the posts together.

2. The torque balance rod assembly according to claim 1, wherein said at least two connecting members includes a pad block mounted therebetween.

3. The torque balance rod assembly according to claim 1, wherein said retaining means includes:

a retaining member for holding the posts and said at least two connecting members, a fastener element extending through the posts and said at least two connecting members, and a second nut mounted to said retaining member.

4. The torque balance rod assembly according to claim 3, wherein said retaining member includes a reinforcing rib formed thereon.

5. The torque balance rod assembly according to claim 1, further comprising a washer with at least two holes mounted between said nuts and said torque rod.

* * * * *